United States Patent [19]

Allen et al.

[11] 4,412,246

[45] Oct. 25, 1983

[54] METHOD OF ADJUSTING A VIDEO MICROSCOPE SYSTEM INCORPORATING POLARIZATION OR INTERFERENCE OPTICS FOR OPTIMUM IMAGING CONDITIONS

[75] Inventors: Robert D. Allen; Nina S. Allen, both of Hanover, N.H.

[73] Assignee: Hamamatsu Systems, Inc., Waltham, Mass.

[21] Appl. No.: 282,412

[22] Filed: Jul. 13, 1981

[51] Int. Cl.³ .............................................. H04N 7/18
[52] U.S. Cl. .................................... 358/107; 358/172; 358/219; 356/434
[58] Field of Search ................. 358/219, 172, 93, 107; 356/434; 235/92 MT

[56] References Cited

U.S. PATENT DOCUMENTS

| | | | |
|---|---|---|---|
| 3,389,220 | 6/1968 | Buzan | 358/172 |
| 4,068,263 | 1/1978 | Soames | 358/107 |
| 4,176,376 | 11/1979 | Kamachi et al. | 358/107 |

Primary Examiner—Robert L. Griffin
Assistant Examiner—Edward L. Coles
Attorney, Agent, or Firm—Irving M. Kriegsman

[57] ABSTRACT

A method is disclosed for adjusting a polarizing or interference type video microscope system so as to achieve significant improvement in resolution, contrast, speed of recording, image fidelity and visibility of fine detail, the video microscope system including (1) a polarizing or interference type microscope having an iris diaphragm and a compensator and (2) a video camera having an adjustable gain control circuit and an adjustable DC restoration circuit. The method involves lowering the gain and the clamp level of the DC restoration circuit in the video camera to a minimum, then adjusting the microscope for optimum optical imaging conditions, these conditions including partly closing the iris diaphragm and setting the compensator for ± approximately the same bias retardation as the specimin (i.e. λ/100–λ/50), then opening the diaphragm to the maximal working aperture of the microscope objective and setting the compensator at a bias retardation of around λ/9 to λ/4, depending on source brightness, and then raising both the gain and the clamp level of the DC restoration circuit to form an image of favorable visual contrast on the video monitor. The invention is based on the discovery that by setting the compensator of the microscope at bias retardations of around λ/9 to λ/4 rather than bias retardations of around λ/100 to λ/50, as in conventional high extinction techniques, the difference between the background brightness and specimen brightness can be increased and that even though a specimen examined at such higher bias retardations may not be visually perceptible when viewed directly though the microscope because of the high background level, by increasing the gain and raising the clamp level of the DC restoration circuit the contrast can be improved such that the image may be made visually perceptible on the video monitor. Using a polarization type microscope, the method may be employed, for example, in observing birefringence in living cells, such as in the motile reticulopodial network of Allogromia laticollaris and using a differential interference contrast microscope the method may be employed, for example, in analyzing microtubule retated motility in the reticulopodial network of Allogromia laticollaris. The invention eliminates the need for using polarizing rectifiers.

8 Claims, 5 Drawing Figures

METHOD OF ADJUSTING A VIDEO MICROSCOPE SYSTEM INCORPORATING POLARIZATION OR INTERFERENCE OPTICS FOR OPTIMUM IMAGING CONDITIONS

BACKGROUND OF THE INVENTION

The present invention relates generally to videomicroscopy and more particularly to a novel method for adjusting a polarizing or interference type microscope and video camera in a video microscope system so as to improve the resolution, contrast, speed or recording, image fidelity and visibility of fine detail.

Video microscope systems are well known in the art and have been used in research and industry for over thirty years for examining various characteristics and properties of small objects. These systems generally include a microscope for forming an optical image of a specimen to be examined, a video camera for converting the optical image into a video image, a video monitor for displaying the video image and usually some form of recording device for permanently recording the video image in either analog or digital form. In U.S. Pat. No. 4,068,263, there is disclosed an example of a video microscope system which includes a microscope, a video camera and a video monitor. In U.S. Pat. No. 4,176,376, there is disclosed an example of a video microscope system in which electrical signals from a video camera are converted into digital signals and stored in a computer.

In the past, the video components in a video microscope system (i.e. the video camera and the video monitor) have been used merely as an alternative arrangement for either viewing an image appearing in the microscope or forming an image which can be recorded for scientific documentation rather than as a means for improving the quality of the image. In particular, the microscope has been adjusted to produce the best optical image of the specimen under examination and the video camera has been employed simply to produce a video image corresponding to the optical image so formed. Consequently, the image appearing in the video monitor has been at most comparable to the image appearing in the microscope and in many cases somewhat inferior.

One type of microscope which is very often used in combination with a video camera system is the polarizing microscope. Although the polarizing microscope has been in use for over a century to examine motile cells, its use in the study of non-muscle cell motility was quite limited until the 1950's when studies were undertaken to determine the factors that limit its sensitivity. These studies culminated in the developement of a polarizing microscope designed for maximum sensitivity. The heart of this instrument is a set of polarization rectifiers, one for each objective and condenser. Polarization rectifiers abolish the polarization cross visible in the rear focal plane of the objective by restoring the uniplanar state of polarization in the specimen and rear-focal planes. Rectification greatly enhances the sensitivity of polarizing microscopes by increasing the available contrast (measured as extinction factor) by as much as two orders of magnitude. These rectifiers also eliminate a troublesome diffraction anomaly causing spurious image contrast and resulting from the perturbing effect of the polarization cross in the Fourier transforms performed by the objective lens in image formation.

High-extinction polarized light microscopy has made possible many important advances in cell biology. However, polarization rectifiers are difficult and expensive to manufacture, and therefore only a limited number have been produced. Consequently, high-extinction polarized light microscopy has been applied by a very limited number of laboratories.

The present invention provides a powerful new method of polarized light microscopy which employs video-enhanced contrast. This method not only avoids the use of polarizing rectifiers entirely, but requires less stringent quality control over some optical components, as the deleterious effects of stray light arising from depolarization are minimal. Nevertheless, the new method matches or exceeds high-extenction methods in both sensitivity and resolving power and makes possible gains of up to four orders of magnitude in recording speed. The new method is based on video manipulations which allow amplification of image contrast while limiting the overall video image brightness.

Another type of microscope which has also been used extensively in combination with a video camera system is the differential interference contrast microscope.

Differential interference contrast (DIC) microscopy was introduced over a quarter of a century ago for the study of phase objects, and began to gain in popularity when it was shown to provide images of higher quality and with fewer artifacts than either phase-contrast or image-duplication interference microscopy. Images in the DIC microscope exhibit shadowcast details wherever interfaces (at organelles, membranes, fibrils, etc.) introduce gradients of optical path. The steepness of shadows depends on the difference in the refractive indices of a detail and its surround, the shape of the phase detail, and the bias retardation.

The strategy for optimizing visual and photographic contrast is well known: The compensator is manipulated, usually well within the range of $\pm 0.1\lambda$ from extinction to the desired setting, at which the dark line across the center of each specimen detail at extinction is shifted to one edge of that detail while the other edge brightens. To achieve the shadowcast effect of a differential image, the bias (or instrumental) retardation applied by the compensator adds to the retardation caused by the positive phase gradient on one side of the specimen and subtracts from that due to the negative phase gradient on the other side. Shadowing contrast is therefore directional, and different specimen details (phase gradients) are selectively emphasized at different settings of the compensator and at different specimen orientations. Under conditions that are optimal for viewing and for photomicrography, the images are severely light limited, especially at high magnification, and photomicrographic exposures of up to 20 seconds are required for exposure in fine grain negative, even with a bright, filtered mercury arc source. In addition, the full resolving power of the microscope usually cannot be employed, because resolution must be sacrificed to enhance contrast by partly closing the iris diaphragm. In accordance with this invention, the performance of the DIC microscope is dramatically improved. To realize this improvement, the iris diaphragm is opened to match the numerical aperture of the objective, and the bias retardation is increased to $\lambda/9-\lambda/4$, well beyond the usual $\pm\lambda 20$ range of a Brace-Köhler compensator. When the compensator is operated within the quasi-linear portion of the sine square curve, which forms the basis for contrast generation in all polarizing and interference microscopes, the visual and photographic images obtained are so saturated by stray light that the specimen may not be detectable to the eye or recordable on film. However, the video images and videomicrographs (photographs of the monitor) obtained by the method of this invention are superior in sharpness and detail to photomicrographs recorded under the very best of high extinction conditions.

SUMMARY OF THE INVENTION

It is an object of this invention to provide a new and novel method for adjusting a video microscope system for optimum imaging conditions.

It is another object of this invention to provide a new and novel method for adjusting a polarizing or interference type video microscope system for optimum imaging conditons.

It is still another object of this invention to provide a method for adjusting a video microscope system of the type described above so as to significantly improve the resolution, contrast, speed of recovery, image fidelity and visibility of the images formed.

It is yet still another object of this invention to provide a method for adjusting a video microscope system as described above so as to enable viewing specimens as small as around 25 nanometers or less.

It is a further object of this invention to provide a method for adjusting a video microscope system as described above which eliminates the need for using polarizing rectifiers.

It is another object of this invention to provide a method of using a video microscope system as described above at compensator settings of around $\lambda/4$ to $\lambda/9$.

A method according to the principles of the present invention for adjusting a polarizing or interference type video microscope system which includes a microscope having an iris diaphragm and a compensator, a video camera having an adjustable gain control circuit and a DC restoration circuit whose clamp level is adjustable and a video monitor comprises lowering the gain and the clamp level of the DC restoration circuit in the video camera to a minimum, then adjusting the microscope for optimum optical imaging conditions, these conditions including partly closing the iris diaphragm and setting the compensator for approximately the same bias retardation as the specimen (i.e. $\lambda/100$–$\lambda/50$, then opening the diaphragm to the maximal working aperture of the microscope objective and setting the compensator at a bias retardation of around $\lambda/9$ to $\lambda/4$, depending on source brightness, and then raising both the gain and the clamp level of the DC restoration circuit to form an image of favorable visual contrast on the video monitor. The invention is based on the discovery that by setting the compensator of the microscope at bias retardations of around $\lambda/9$ to $\lambda/4$ rather than bias retardations of around $\lambda/100$ to $\lambda/50$, as in conventional high extinction techniques, the difference between the background brightness and specimem brightness can be increased and that even though a specimen examined at such higher bias retardations may not be visually perceptible when viewed directly though the microscope because of the high background level, by increasing the gain and raising the clamp level of the DC restoration circuit the contrast can be improved such that the image may be made visually perceptible on the video monitor.

The foregoing and other objects and advantages will appear from the description to follow. In the description reference is made to the accompanying drawings which form a part thereof, and in which is shown by way of illustrating, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENTS

The present invention is based on the discovery that by setting the compensator of the microscope at bias retardations of around $\lambda/9$ to $\lambda/4$ rather than around $\lambda/10$ to $\lambda/30$, as in conventional high extinction techniques, the difference between the background brightness and specimen brightness can be increased and that even though a specimen examined at such higher bias retardations may not be visually perceptible when viewed directly through the microscope, by increasing the gain and raising the clamp level of the DC restoration circuit and contrast can be improved such that the image may be made visually perceptible on the video monitor.

Figure 1:
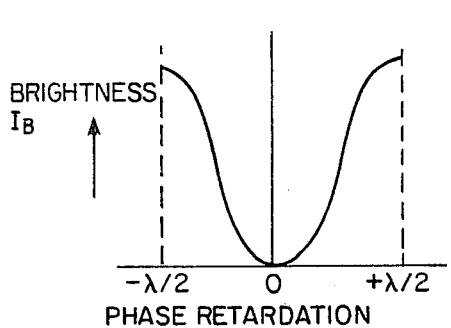
FIG. 1 is a curve illustrating how the brightness of the background of a scene varies with phase retardation.
Figure 2:
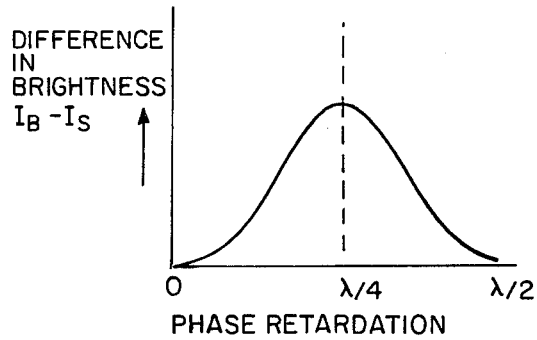
FIG. 2 is a curve illustrating how the difference in brightness between the background and a specimen varies with phase retardation.

The basic theory of the invention may be better understood when considered in connection with FIGS. 1 and 2.

Figure 3:
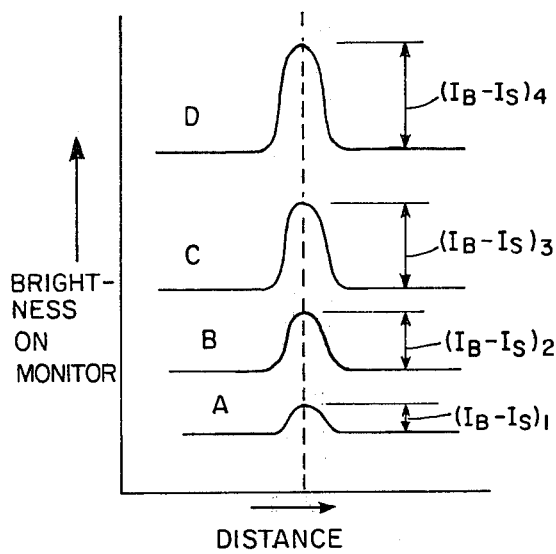
FIG. 3 is a series of curves illustrating the difference between the background and the specimen at different background brightness settings.

As can be seen in FIGS. 1 and 2, as the compensator of a polarizing or interference type microscope is set for increased phase retardations the scene or background brightness (FIG. 1) and the difference in brightness between the background and the specimen brightness (FIG. 2) both increase. This is also illustrated in FIG. 3 where the difference in background brightness $I_B$ and specimen brighness $I_S$ are shown for four different background brightness settings, the settings being labelled A, B, C and D. As can be seen, the difference in brightness is the smallest on curve A and the largest on curve D.

To an approximation, visually perceived contrast (C) has hitherto been represented by the difference in brightness or intensity of the background ($I_B$) and that of the specimen ($I_S$), divided by background intensity whether the image is observed directly in the microscope, on a television monitor, or in the natural environment. Thus, as shown in formula (1) below:

$$C = (I_B - I_S)/I_B \quad (1)$$

Visual microscopy has nearly always been carried out under conditions in which the denominator was small. In fact, this is the rationale of high-extinction polarized light and differential interference contrast methods.

Figure 4:
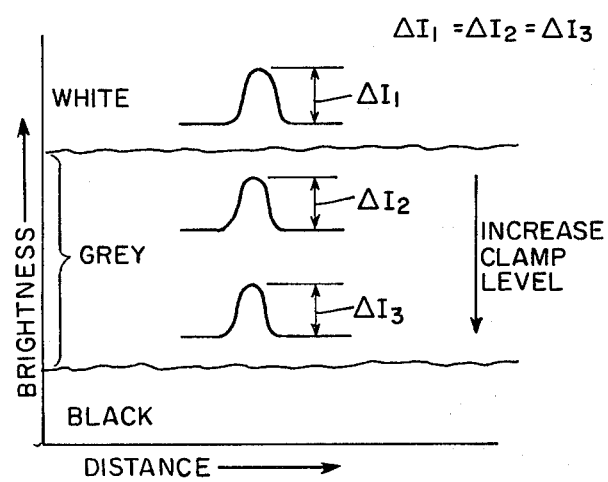
FIG. 4 is a series of curves illustrating the effect of changing the clamp level on the DC restoration circuit in a video camera.

The present invention increases the contrast of an image of the specimen as it appears on the video monitor by reducing the background brightness $I_B$ without diminishing the difference between the background brightness and the specimen brightness $(I_B - I_S)$. The present invention accomplishes this by increasing the clamp level of the DC restoration circuit in the video camera. This has the effect of increasing the contrast (C) by lowering the background brightness without changing the difference in background and specimen brightness $(I_B - I_S)$. Thus, as illustrated in FIG. 4, as the clamp level is increased, the overall brightness decreases (moving down from the white to the grey) while the difference in background and specimen brightness $(I_B - I_S)$ remains unchanged.

Consequently, the formula for contrast for a video image when modified pursuant to this invention is shown below in formula (2) as:

$$C = (I_B - I_S)/(I_B - I_v) \quad (2)$$

where $I_v$ is the reduction in signal level introduced by turning an offset knob which changes the clamp level of a DC restoration circuit. This manipulation has the effect of adding a "negative intensity," thereby reducing the denominator of the formula and increasing visual contrast.

The method of the present invention takes advantage of a video system with a high dynamic range and an extended offset range to work at bias retardations at which phase retardations due to specimen birefringence present virtually linear contrast. This feature not only promotes speed, accuracy, and convenience of measurement, but has a number of other benefits as well. The most important of these is freedom from the necessity to use polarization rectifiers to avoid the diffraction anomaly present near extinction. As can be shown, this anomaly disappears above $\Delta_B = \lambda/9$.

Another important advantage is freedom from certain other constraints of high-extinction conditions. For example, it can be shown that rotation of the polarizer by angles of up to 30° from extinction weakens but does not obliterate the video signal, whereas the rotation of only a few degrees obliterates the visual image. The significance of this observation is that with the present technique, it is no longer necessary to select microscope components to achieve a very high extinction factor.

Figure 5:
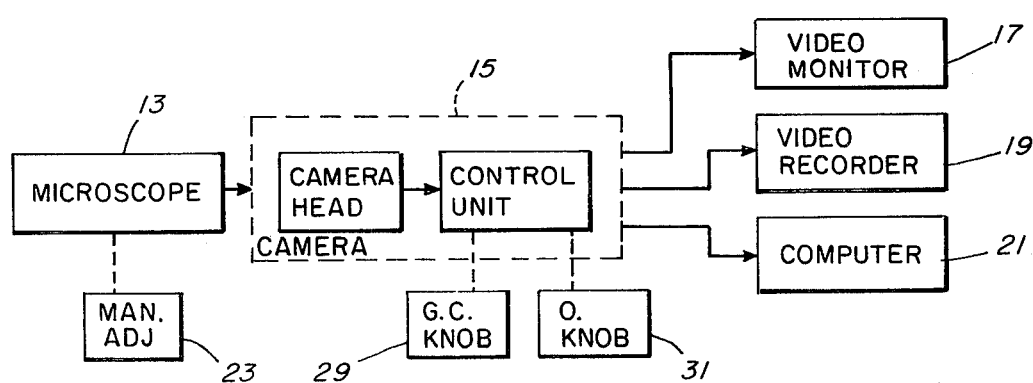
FIG. 5 is a block diagram of a video microscope system for use in practicing the method of the present invention.

Referring now to FIG. 5, there is illustrated a block diagram of a video microscope system which may be used in practicing the method of the present invention. The video microscope system, which is identified generally by reference numeral 11, includes a microscope 13, a video camera 15, a video monitor 17, a videotape recorder 19 and a computer 21.

Microscope 13 may be, for example, an inverted Zeiss Axiomat microscope and includes an iris diaphragm and a compensator. The compensator may be angularly adjusted for different phase angle settings by turning a manual adjustment 23. Video camera 15 includes a camera head 25 and a control unit 27, the control unit 27 including a gain control circuit that is manually adjustable by a gain control knob 29, a DC restoration circuit whose clamp level is manually adjustable by an offset knob 31 and an interface for interfacing the camera with computer 21. The gain control circuit is designed to increase the gain by a factor of up to about 16 and the DC restoration circuit has a clamp level that may be adjusted over a corresponding range. Video camera 15 may be, for example, a Hamamatsu Systems Inc. Model No. C-1000 Computer Compatable Video Camera having in the control unit a Hamamatsu Systems Inc. Model No. M1438 Gain Expansion Assembly Circuit, this latter unit including a gain control circuit and a DC restoration circuit as described above.

The video monitor 17, the videotape recorder 19 and the computer 21 may be of any conventional type, modified in a customary manner, if necessary, to be compatable with the particular video camera 15 that is employed.

The method of practicing the invention is as follows: First, the gain control knob 29 and the offset knob 31 are set to zero and the microscope 13 is adjusted in the conventional manner for Köhler illumination and optimum optical imaging conditions as seen through the microscope 13. These conditions normally include partly closing the iris diaphragm and setting the phase retardation at ± approximately the same retardation as the specimen (approximately $\lambda/100$ to $\lambda/50$). Once these conditions are realized, the iris diaphragm is fully opened and the compensator setting is increased to within the range of around $\lambda/4$ to $\lambda/9$. Then the gain the the clamp level of the DC restoration circuit are both increased until an image of favorable contrast appears on the video monitor 17.

EXAMPLES OF THE METHOD AS APPLIED TO POLARIZATION

The microscope 13 used was an inverted Zeiss Axiomat equipped with film polarizer and analyzer adjusted to 0° and 90°, respectively, and a quarter-wave plate ($\lambda/4$) for the green line ($\lambda = 546$ nm) of a 50 W mercury lamp. The quarter-wave plate was set with its slow axis at 0° and locked. The rotating analyzer thus served as a de Sénarmont compensator with a range of $\pm \lambda/2$ and a sensitivity of $\lambda/180$/degree. The objective was an unrectified $100 \times /1.3$N.A. planapochromat, and the condenser was either the Zeiss achromatic-aplanatic condenser or an inverted 100/1.3 planapochromatic objective of the photomicroscope series. The microscope was adjusted to a small bias retardation to find the specimen, and then the bias retardation was increased to obtain the best image on the video monitor. Settings between $\pm 20° - 45°$ ($\lambda/9 - \lambda/4$) proved best for the method. The Axiomat is equipped with a panchratic (zoom) system with a magnification range of 4:1. In order to prevent the video image from limiting the resolution of the recorded image, an additional magnification factor of two was added in the 1.6× projective system, so that the fully magnified image visible on the monitor corresponded to a 21.3-μm square. Under these conditions, one line-pair in the video image corresponded to 133 nm in the optical image. The Axiomat has a major advantage over other microscopes for video microscopy because the objectives are entirely internally corrected and thus do not require corrected projective lenses in the optical interface to the video camera.

The video camera 15 was a Hamamatsu C-1000 camera having the above noted variable again and offset feature, its 1024-line (4.1 interlace) resolution, and its binary circuitry, which makes it compatible with computers for processing of images. The video signal (256,512, or 1024 lines) from the camera control unit (CCU) was fed through a GYYR video timer to a SONY TWO-9000 time-lapse videocassette recorder (VCR), and to a Panasonic Model WV5310 9-inch monitor with underscan to permit the entire video image to be recorded. The recorded image appeared to maintain nearly all the quality of the "live" video image but was limited by bandwidth to a nominal resolution of 360 lines in monochrome. A microphone registered additional data and remarks during the course of the experiments. A second monitor continuously viewed the output of the CCU. Two camera heads were used: A chalnicon selected for its high S/N ratio (160/1) and sensitivity (250 na/LX), and a silicon-intensified target (SIT) camera for recording images of Airy disk diffraction patterns of low intensity.

Human buccal epithelial cells were mounted in distilled water and observed fresh. Video signals levels were adjusted by reference to the intensity monitor so that the darkest part of the image was slightly above the pedestal level, and the gain was kept below camera saturation at all times.

A single photomicrograph was recorded on Tech Pan 2415 film processed in diafine. The negative was printed on No. 6 paper. Videomicrographs were made from live or videotaped images by photographing the monitor on 35-mm Plus X film through 55-mm macro lens (Nikon) at an exposure of ¼ second at F8. Film was developed in Microdol (1:3 dilution). When the images showed motion, single video frames (1/60 second) were photographed with the recorder in pause mode. The video image clarity and contrast improved as the bias retardation exceeded the usual range of a Brace-Köhler compensator ($\lambda/30-\lambda/10$).

Thrice-cycled reconstituted microtubules were prepared from chick brain by the procedure described in the Proceedings of National Academy of Science 70:765–768. The microvilli of intestinal epithelium of the 5 day-old chick are approximately 100 nm in diameter and 2 $\mu$m long and therefore make a convenient resolution test for the method. There was no difficulty resolving adjacent microvilli and it was noted that the same microvillus reversed its contrast as the focus was changed. However, the image in best focus always exhibited the contrast expected of a positively birefringent fiber. The best focus was slightly different at plus- and minus-bias retardation settings, as is well known for unrectified polarizing microscopes.

Reconstituted microtubules (MTs), which are known to have a stain diameter of about 25 nm or about one-tenth the usually accepted limit of resolution of the light microscope, were clearly seen on the video monitor by the method, even though no sign of them can be seen by eye, regardless of the subjective brightness of the image. An unexpected difficulty the high-video-gain settings required to obtain video images of MTs was a mottle pattern traced to dirt on and/or imperfections in an optical surface projected near the image plane. However, the mottle pattern was partially removed from the photographic image by printing the negative through a filter consisting of a positive transparency print of the mottle pattern alone. The lack of visible MTs oriented parallel to the polarizer and analyzer directions should be noted. As expected, different MTs in the same field became visible as their contrast was modulated by rotating the stage. It is concluded that the technique is sufficiently sensitive to detect the presence of single MTs in vitro even without any image-processing procedures.

Allogromia laticollaris were cultivated in artificial seawater—Erdschreiber containing Nitzchia and other diatoms, which serve as prey. A few cells were transferred to a coverglass sandwich preparation in which the lower coverglass had been treated for 30 minutes with a 1.5 mg/ml solution of protamine sulfate and subsequently washed with distilled water and airdried. This treatment caused portions of the reticulopodial network to stick to the glass and spread locally.

Single-frame (1/60 second) videomicrographs of the same region of a reticulopodial network (RPN) of Allogromia under different bias retardation conditions were obtained at compensator settings of $\pm\lambda/12$ ($\pm 0.65\pi$ radians), and the dominant features of the image were the two types of unidentified cytoplasmic particles. The larger of these exhibit strong scattering at small bias retardations ($\Delta_B$), and the smaller ellipsoidal particles showed clear positive axial birefringence. The image clarity and contrast increased at higher $\Delta_B$ values ($\lambda/9$) as would be expected.

As can be appreciated, at bias retardations between one-ninth and one-quarter wave, the diffraction anomaly observed near extinction disappears. Consequently, polarizing rectifiers are not required with the method, and images previously requiring photographic exposures of around 20 seconds are sufficiently bright to be registered on the video monitor in 1/60 second. Using an intensity monitor, quantitative measurements of cellular birefringence can be retrieved from live or videotapped images displaying a linear relationship between contrast and phase retardation due to birefringence. The method also renders accessible to polarized light analysis a number of objects that scatter or depolarize too much light to be studied by high extinction methods.

EXAMPLES OF THE METHOD AS APPLIED TO DIFFERENTIAL INTERFERENCE CONTRAST MICROSCOPY

The microscope used was an inverted Zeiss Axiomat equipped with an internally corrected 100×/1.3N.A. planapochromatic objective and modified Wollaston prism beam splitters of new design. The analyzer and polarizer were crossed, and a quarter-wave plate with its slow axis parallel to the transmission plane of the polarizer was placed before the analyzer, making the combination of the latter two elements a de Sénarmont compensator with a range of $\pm\lambda/2(\pi$ radians) and a sensitivity of $\lambda/180$ per degree of rotation. The pin adjustment of the second Wollaston was centered to bring the rear focal plane to extinction with the polarizer and quarter-wave plate set to 0° and the analyzer at 90°. The image could be magnified through a range of 4× by the panchratic (zoom) lens of the Axiomat, and the optical interface to the video camera was a 1.6× lens. The width of the video image corresponded to 21.3 $\mu$m at the highest magnification used.

The video system was the same as above.

The bias retardation was increased to well out of the range used in high extinction methods ($\lambda/100-\lambda/50$) and into the range of $\lambda/20-\lambda/4$, where the video signal $I_B - I_s$ is optimal. The offset knob was adjusted to maintain good visual contrast. At low magnification, the source was attenuated by adding either neutral density filters or an auxiliary polarizer between the source and instrumental polarizer. For most high-resolution work, $\Delta_B$ was maintained at about $\lambda/9$ with as little source attenuation as possible. In the presence of light-scattering particles, higher $\Delta_B$ settings were used, and the source was attenuated as required.

Chick brain microtubules, and the marine foraminifer were prepared as described above. Intestinal villi were obtained by gently scraping them from extensively washed sections of 5 day-old chick small intestine.

The procedures for preparing whole mounts of Allogromia for stereo transmission electron microscopy at 100 KV were as described above.

MIcrotubules (MTs) have a stain diameter of around 25 nm in electron micrographs; consequently, they are about a factor of 10 thinner than the generally accepted theoretical limit of resolution of an optical microscope under the conditions used. Using the 100×/1.3N.A. planapochromatic objective and a working aperture of 1.0-1.1, it was barely possible to see shadowcast MTs suspended in assembly medium.

By changing to optimal conditions for video microscopy, however, these same microtubules could be easily seen on the monitor. The required steps to switch from high extinction viewing conditions to those of the present method were (1) The opening of the aperture diaphragm to a working aperture of 1.3 with the other conditions of Kohler illumination met as exactly as possible. (2) The compensator was set to a bias retardation of $\lambda/9-\lambda/4$, depending on the source brightness and magnification. (3) The gain and offset knobs were adjusted to achieve the most favorable visual or photographic contrast. Once this change of optical conditons had been made, the optical image of microtubules became invisible to the eye.

Microvilli of the small intestine of the chick are around 100 nm in diameter and serve as a test of the resolving power of the microscope using the criteria accepted in other forms of microscopy. These microvilli, which are less than one-fifth of a wavelength of green light (546 nm) in diameter, were readily resolved despite their close packing.

In a prior art study of the RPN of Allogromia, it was noted that the bundles of about a dozen microtubules could be seen and recorded photographically an intermediate magnifications, by DIC microscopy. The photographic exposures required were on the order of a few seconds unless a strobe flash was used. This time resolution is inadequate because particles move up to 10 $\mu$m/sec.

The present method made it possible to see and record for the first time the dynamic behavior of smaller numbers of microtubules and organelles at a magnification of 7,000× under optimal contrast conditions.

The most instructive observations so far are of thin, spread areas of the RPN at junctions of filopodia caused by pretreatment of the coverglass with protamine sulfate. In several such flattened areas, estimated by scanning electron microscopy to be about 0.1–0.2 $\mu$m thick, bundles of MTs could be seen to enter the flattened area, splay out, i.e., "unzip", and zip together again. To do this, some must obviously be moving relative to the others both axially and laterally. In some cases, filopodia around 0.1 $\mu$m in diameter were formed at an edge of the flattened area when a MT pushed out a tubular extension of the cell membrane. These MTs were subsequently withdrawn, leading to the immediate disappearance of the filopodium.

Three types of cytoplasmic organelles from 1–0.1 $\mu$m or less in diameter were seen to move in either direction (sometimes reversing) along both bundles of MTs and single MTS. Some organelles "fell off" the MTs and remained motionless until another MT came along to provide a substrate or carrier for movement.

In stereo electron micrographs of such flattened areas, there was ample evidence of particle attachment to groups of MTs and to single MTs.

Additional materials pertaining to the invention are disclosed in the publication Cell Motility, pages 275-302 (1981), Alan R. Liss Inc. which materials are incorporated herein by reference.

Although the invention has been described with specific examples pertaining to polarizing and differential interference contrast microscopes, it should be understood that it is applicable also to other types of microscopes, such as double beam interference microscopes, surface reflection interference microscopes variable phase contrast, dark-field and fluorescence microscopes.

What is claimed is:

1. A method of adjusting a polarizing or interference type video microscope system for optimum imaging conditions, said video microscope system including a polarizing or interference type microscope for forming an optical image of a specimen, a video camera for forming a video image of the optical image and a video monitor for displaying the video image so formed, said microscope including an iris diaphragm and a compensator, said video camera including an adjustable gain control circuit and a DC restoration circuit having an adjustable clamp level, said method comprising:
   a. adjusting the microscope for optimum optical imaging conditions as seen through the microscope with the gain and clamp level of the DC restoration circuit both at a minimum, said optimum optical imaging conditions including partly closing and iris diagragm and setting the compensator at approximately the same bias retardation as the specimen,
   b. changing the compensator setting to within the range of around $\lambda/4$ to $\lambda/9$, and then
   c. increasing the gain and changing the clamping level of the DC restoration circuit in the video camera for optimum video imaging conditions as seen on the video monitor.

2. The method of claim 1 and further including increasing the opening of the iris diaphragm.

3. The method of claim 1 and wherein increasing the gain and clamp level of the DC restoration circuit comprises repeatedly increasing the gain and clamp level in small amounts until an image of favorable contrast appears.

4. The method of claim 1 and wherein the clamp level of the DC restoration circuit is adjusted manually.

5. The method of claim 4 and wherein the gain control is adjusted manually.

6. The method of claim 3 and wherein said microscope is a polarizing type microscope.

7. The method of claim 3 and wherein said microscope is a differential interference contrast microscope.

8. A method of reducing the amount of stray light present in a video image of an object, the video image being formed by a video camera and being displayed on a video monitor, the video camera including a manually adjustable gain control circuit and a DC restoration circuit having a manually adjustable clamp level, the method comprising:

a. forming said video image of the object on said video monitor with the gain control and the clamp level of the DC restoration circuit at a minimum, and then b. increasing the clamp level of the DC restoration circuit and the gain for optimum video imaging conditions as seen on the video monitor.

* * * * *